United States Patent
Vogler

(10) Patent No.: US 12,319,010 B2
(45) Date of Patent: Jun. 3, 2025

(54) CONVERTER WITH AN INTEGRATED BOLT

(71) Applicant: HERRMANN ULTRASCHALLTECHNIK GMBH & CO. KG, Karlsbad (DE)

(72) Inventor: Ulrich Vogler, Uhldingen-Mühlhofen (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 129 days.

(21) Appl. No.: 18/552,964

(22) PCT Filed: Mar. 21, 2022

(86) PCT No.: PCT/EP2022/057274
§ 371 (c)(1),
(2) Date: Sep. 28, 2023

(87) PCT Pub. No.: WO2022/207379
PCT Pub. Date: Oct. 6, 2022

(65) Prior Publication Data
US 2024/0190085 A1 Jun. 13, 2024

(30) Foreign Application Priority Data
Apr. 1, 2021 (DE) ...................... 10 2021 108 462.8

(51) Int. Cl.
*B29C 65/08* (2006.01)
*B23K 20/10* (2006.01)
*B29C 65/00* (2006.01)

(52) U.S. Cl.
CPC .......... *B29C 66/816* (2013.01); *B23K 20/106* (2013.01); *B29C 65/08* (2013.01)

(58) Field of Classification Search
CPC .......... B06B 3/00; B06B 1/0611; B29C 66/81; B29C 65/08; B23K 20/106
(Continued)

(56) References Cited

U.S. PATENT DOCUMENTS 8,621,827 B2 * 1/2014 Vogler ................ B29C 66/8145
53/370.7
10,220,413 B2 3/2019 Gmeiner et al.
(Continued)

FOREIGN PATENT DOCUMENTS

DE 10023302 A1 11/2001
DE 102014100817 A1 7/2015
(Continued)

OTHER PUBLICATIONS

German Search Report for corresponding German Patent Application No. 102021108462.8 dated Feb. 1, 2022.
(Continued)

*Primary Examiner* — James D Sells
(74) *Attorney, Agent, or Firm* — Greer, Burns & Crain, Ltd.

(57) ABSTRACT

A converter having a converter base part, a bolt connected to the converter base part, a tensioning element and at least one piezo element with a through-opening, the bolt penetrating the through-opening and the tensioning element tensioning the at least one piezo element in the direction of the converter base part, wherein that the bolt is connected to the converter base part in a material bond.

15 Claims, 4 Drawing Sheets

(58) Field of Classification Search
USPC .................................................. 156/580.1
See application file for complete search history.

(56) References Cited

U.S. PATENT DOCUMENTS

| | | |
|---|---|---|
| 2002/0014117 A1 | 2/2002 | Raffalt et al. |
| 2016/0001498 A1 | 1/2016 | Voegler et al. |
| 2017/0274420 A1 | 9/2017 | Toda |
| 2018/0304308 A1 | 10/2018 | Ohnishi |
| 2021/0297012 A1 | 9/2021 | Ertz et al. |

FOREIGN PATENT DOCUMENTS

| | | |
|---|---|---|
| DE | 102018120124 A1 | 2/2020 |
| WO | 2008156116 A1 | 12/2008 |

OTHER PUBLICATIONS

International Search Report for corresponding International Patent Application No. PCT/EP2022/057274 dated Jun. 27, 2022; priority document (English Translation Only).
Notification and English Translation of the International Preliminary Report on Patentability for International Patent Application No. PCT/EP2022/057274 dated Oct. 19, 2023 (11 pages).

* cited by examiner

CONVERTER WITH AN INTEGRATED BOLT

CROSS-REFERENCES TO RELATED APPLICATIONS

This application is a national phase of International Patent Application No. PCT/EP2022/057274, filed on Mar. 21, 2022, which claims the benefit of German Patent Application No. 10 2021 108 462.8, filed on Apr. 1, 2021, the entire disclosures of which are incorporated herein by way of reference.

FIELD OF THE INVENTION

The present invention relates to a converter for an ultrasonic vibration unit. The converter is provided and adapted to convert an AC electrical voltage into an acoustic vibration.

BACKGROUND OF THE INVENTION

The converter has a converter base part, a bolt, a tensioning element and at least one piezo element with a through-opening, wherein the bolt of the converter penetrates the through-opening and the tensioning element tensions the at least one piezo element in the direction of the converter base part. The converter base part has a threaded hole into which the bolt is screwed. Further, the converter is designed as a sonotrode and the converter base has a welding surface designed to contact a material to be processed.

The tensioning element ensures that a mechanical vibration of the piezo element is transmitted to the converter base part.

In this case, several piezo elements are often mounted one above the other in the form of discs with a bolt and clamped onto one surface of the converter base part with the aid of a tensioning element in the form of a screw nut, so that by applying an AC electrical voltage to the piezo elements, the piezo elements excite a mechanical vibration of the converter base part. Corresponding converters are known from the US 2017/274420 A1 or the US 2016/001498 A1

Such converters are often used in ultrasonic vibration units consisting of a sonotrode and a converter. The converter or the converter base part is screwed to the sonotrode so that a mechanical vibration of the converter base part is transmitted to the sonotrode. Often, such ultrasonic vibration units also have an amplitude transformer, which is arranged between the converter and the sonotrode and is intended to transform, i.e. generally increase, the amplitude of the vibration. The mechanical vibration generated by the piezo elements is thereby amplified.

Especially in applications with limited space, the amplitude transformer is often dispensed with, so that larger amplitudes have to be generated with the converter. However, with the known converters, this results in an over-stressed area forming in the area where the bolt is screwed to the converter base part, which significantly reduces the service life of the ultrasonic vibration unit. As a rule, cracks then form in the material near the threaded connection over time, which has a negative effect on the vibration behavior.

This problem has so far been addressed by, for example, reducing the preload, i.e. the force with which the at least one piezo element is pressed against the converter base part. However, this reduces the vibration amplitude and the vibration quality due to the poorer coupling of the piezo element and converter base part, which is not acceptable for all applications. Another possibility is to reduce the amplitude of the applied AC voltage with the consequence that the amplitude of the ultrasonic vibration is also reduced. Again, this measure is not suitable for all applications. In any case, this increases the necessary machining time.

Finally, an attempt was made to get the stresses under control by using special thread forms with specially selected corner radii and a corresponding undercut in the bore of the converter base part in which the bolt is screwed. This actually leads to an increase in service life; however, it is comparatively complex and therefore expensive.

In practice, these systems can therefore only be operated with low vibration amplitudes and also have a limited operating time.

Based on the described prior art, it is therefore the task of the present invention to provide a converter that can be operated with high amplitudes and at the same time ensures a long operating time.

SUMMARY OF THE INVENTION

According to the invention, this task is solved in that the bolt is materially bonded to the converter base part and the bolt of its connection point to the converter base part is provided with a transition radius R which is >0.5 mm. A material bond is understood to be all connections in which the connecting partners, i.e. here the bolt of the converter and the converter base part, are held together by atomic or molecular forces.

In principle, the bolt can be welded or soldered to the converter base part.

However, this is also time-consuming. In a preferred embodiment, the bolt and the converter base part are therefore made from one piece of material. The bolt and the converter base part are therefore formed together in one piece.

In a further preferred embodiment, it is provided that the bolt is provided with a transition radius R at its connection point to the converter base part, which is greater than >1 mm and preferably >2 mm.

The provision of a transition radius leads to stabilization between the bolt and the converter base part, as the stresses in the material are reduced by a smaller notch effect factor. In principle, the larger the transition radius, the greater the stabilization. However, it should be noted that the piezo element is pushed over the bolt and pressed against the converter base part. This requires contact between the piezo element and the converter base part over as full a surface as possible in order to transmit the ultrasonic vibration and not damage the piezo element. Piezo elements are usually made of piezo ceramics, which are very brittle and therefore react sensitively to tensile stresses, e.g. as a result of deformation. The piezo element must therefore not lie at the transition radius.

In a further preferred embodiment, it is provided that a spacer disc with a through-opening is provided, wherein the spacer disc and the at least one piezo element are arranged in such a way that the bolt first penetrates the through-opening of the spacer disc and then the through-opening of the at least one piezo element, so that the spacer disc abuts both the converter base part and the piezo element. In order to ensure optimal force transmission, the spacer disc, which may be made of titanium or a titanium alloy, for example, is helpful.

Since, according to a preferred embodiment, the converter base part and the bolt are made from one piece, it is not possible from a manufacturing point of view to produce the surface of the converter base part in the area of the connection with the bolt with a high surface quality. Usual lapping processes cannot be carried out due to the presence of the bolt. However, any unevenness on the surface of the converter base part will reduce vibration transmission when the piezo element abuts this surface. By providing a spacer disc that can be made with very high surface quality (roughness Ra<0.01 and flatness <0.005 mm), at least one ultrasonic vibration transmission from the at least one piezo element into the spacer disc is possible in good quality. If the spacer disc is pressed onto the surface of the converter base part, which may not be completely flat, the ultrasonic vibration is nevertheless transmitted better than if the piezo element were pressed directly onto the surface of the converter base part.

In another preferred embodiment, the through-opening of the spacer disc is widened at least on its side facing the converter base part. This can be done, for example, by providing the corresponding edge with a chamfer.

It can be advantageous to also design the other side of the spacer disc accordingly. This has the advantage that when assembling the ultrasonic vibration system, it is not necessary to ensure that the spacer disc is pushed onto the bolt of the converter in the correct orientation.

The extension is particularly advantageous if the bolt is provided with a transition radius at the connection to the converter base part, as the spacer disc can then lie flat on the converter base part, even if the transition radius is relatively large. In a preferred embodiment, the widening is designed in such a way that the through-opening of the spacer disc, in a sectional view parallel to the longitudinal direction along the length I, has an entry radius E on its side facing the converter base part, which is >0.5 mm, preferably >1 mm and particularly preferably >2 mm.

In particular, it is advantageous if the following applies to the entry radius E: 2 R>E>R, whereby the following applies preferably: 1.2 R>E>R.

In a further preferred embodiment, it is provided that the bolt has an end portion which faces away from the converter base part and is provided with an external thread. In this regard, it has been found that the external thread is best formed as a saw thread. The saw thread is asymmetrical and has a profile that resembles a saw tooth.

As already mentioned above, in a preferred embodiment it is provided that the bolt and the converter base part are made of one piece of material.

By this measure, the material consumption is usually higher, since the bolt of the converter has a significantly smaller extension in the transverse directions, i.e. perpendicular to the longitudinal axis running along the length I, than the converter base part and accordingly, in one-piece production, a lot of material has to be removed in the area of the bolt in order to produce the bolt.

The described measure is therefore particularly advantageous if the converter is designed as a sonotrode. The converter base part has a welding surface which is intended to come into contact with a material to be machined.

Such sonotrodes with integrated converter are also called compact vibrators. In a compact vibrators, the bolt is located inside the sonotrode. I.e. the sonotrode or its converter base part has a welding surface which is intended to come into contact with a material to be machined and a rear side which is arranged opposite the welding surface, whereby a recess is formed in the rear side in which the bolt is arranged.

This arrangement of the bolt within the sonotrode means that practically no additional material is required to form the bolt. On the contrary, in this embodiment the recess in the rear side does not have to be completely cleared, since the bolt of the converter remains in place, even material is saved.

In a further preferred embodiment, it is provided that the converter has a length I from the welding surface to the rear side, the bolt extending in the direction of the length I, the length I preferably corresponding approximately to half the wavelength of an ultrasonic oscillation with which the converter, which is in the form of a sonotrode, can be brought into resonant oscillation.

In a further preferred embodiment, it is provided that the position at which the bolt is fastened to the converter base part is arranged in the vicinity of the midpoint of the length I, i.e. is spaced from the welding surface by the distance d for which applies: 0.4/>d>0.71.

It is particularly preferred if the at least one piezo element is arranged in the longitudinal direction within the length I, i.e. between the welding surface and the rear side.

For example, at least four piezo elements can be provided, each with a through-opening, which are penetrated by the bolt and which are all arranged in the longitudinal direction between the welding surface and the rear side of the converter base part, i.e. within length I. This has vibrational advantages as the sonotrode is now excited essentially in its interior.

BRIEF DESCRIPTION OF THE DRAWINGS

Further advantages, features and possible applications of the present invention will become clear from the following description of a preferred embodiment and the accompanying figures. It shows.

DETAILED DESCRIPTION OF THE PREFERRED EMBODIMENTS

Figure 1:
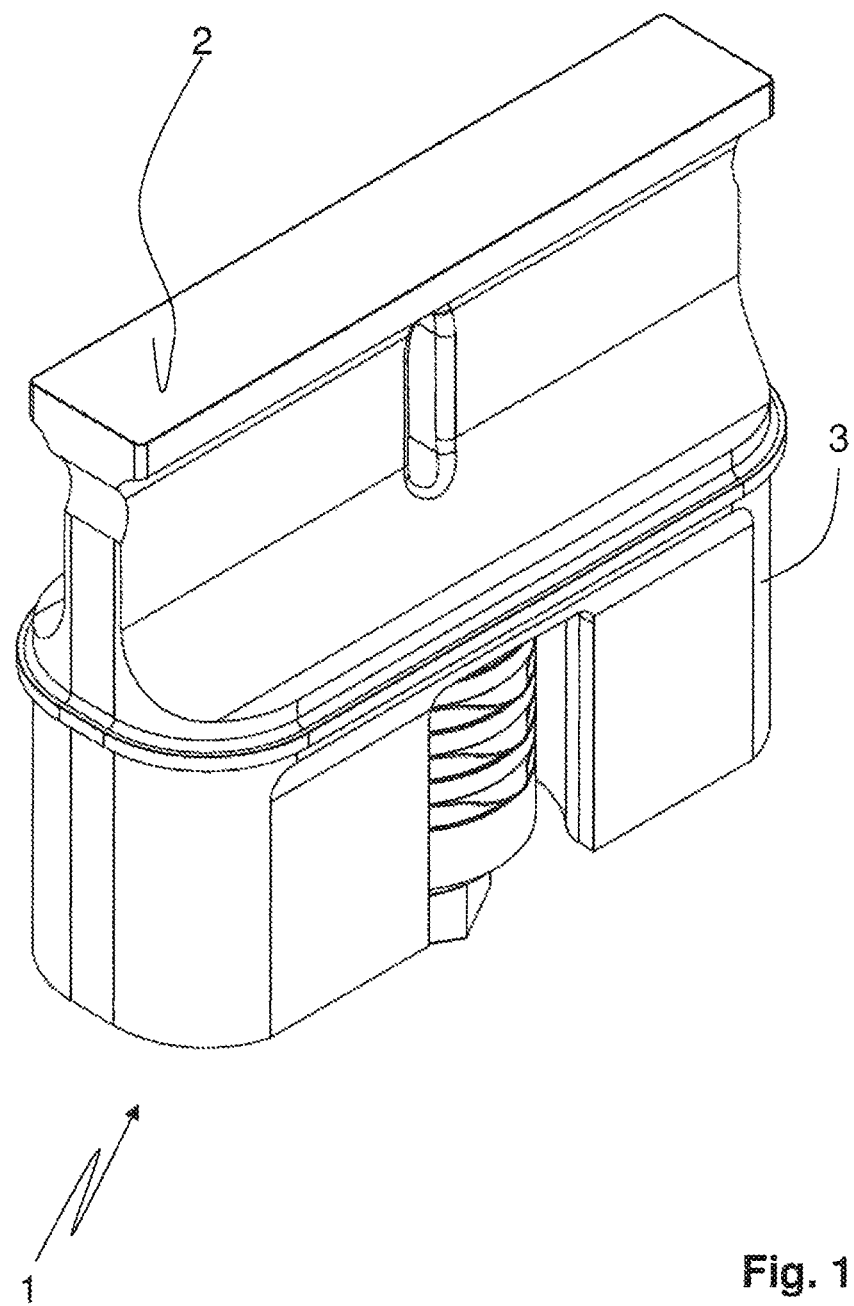
FIG. 1 a perspective view of a converter according to the invention.

FIG. 1 shows a perspective view of a converter according to the invention. The converter 1 is designed as a sonotrode and has a welding surface 2. The welding surface 2 is intended to come into contact with a material to be machined and to transmit an ultrasonic vibration into the material.

Figure 2:
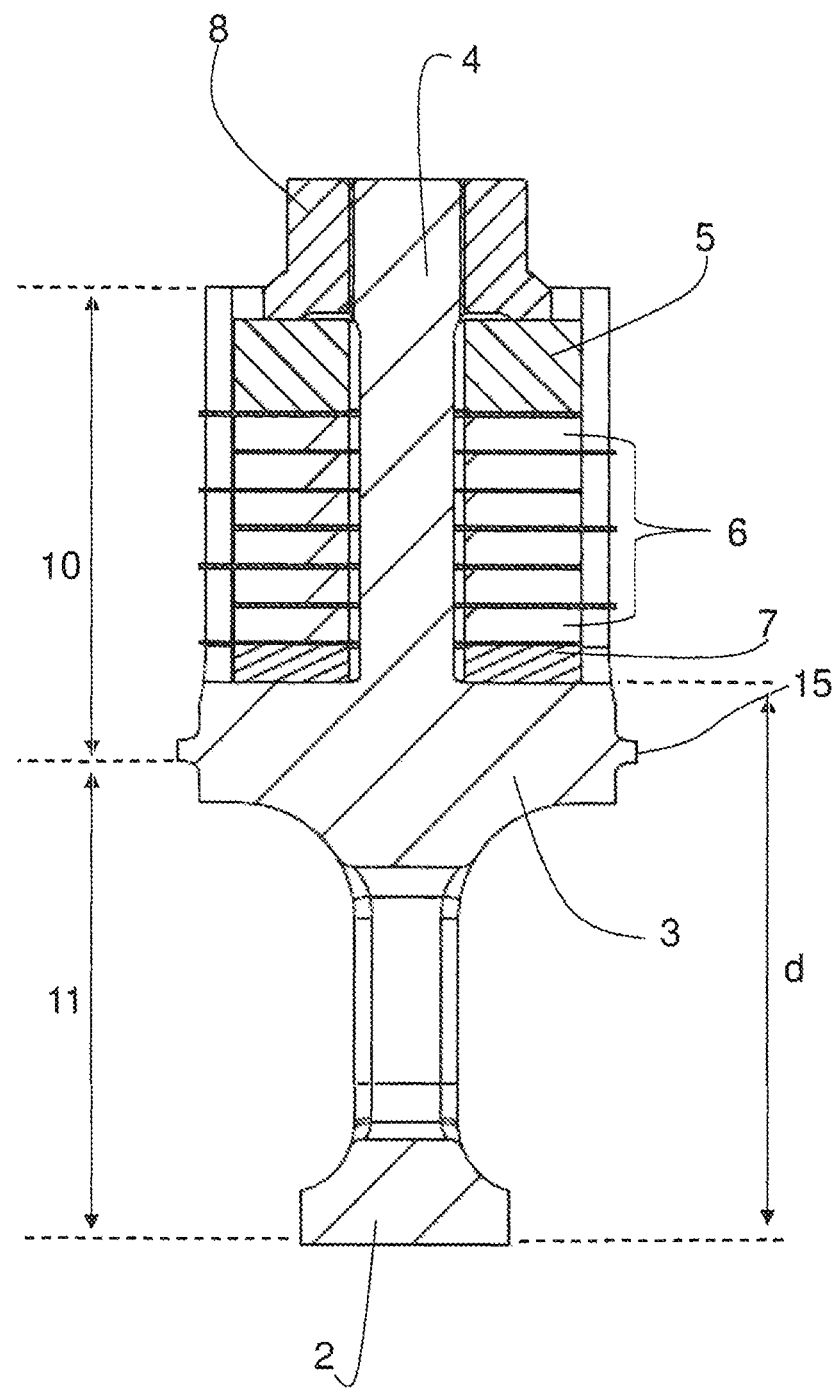
FIG. 2 a sectional view through the embodiment of FIG. 1.

The converter 1 has a converter base part 3, which has a rear section 10 with a rear side arranged opposite the welding surface 2, and a front section 11, as can be clearly seen in the cross-sectional view of FIG. 2. Here, a circumferential collar 15 forms the boundary between the front section 11 and the rear section 10. During vibration, a standing wave is formed longitudinally along the length I in the converter. The circumferential collar is located in the vicinity of a vibration minimum. The converter can be held on the circumferential collar, e.g. via O-rings, without significantly influencing the vibration behavior of the converter.

The front section 11, which has the welding surface 2, is for the most part much narrower than the rear section 10. This results in an amplitude transformation in this section. In the rear section 10, a recess is made in the converter base part in which a bolt 4 is integrally connected to the converter base part 3.

Figure 3:
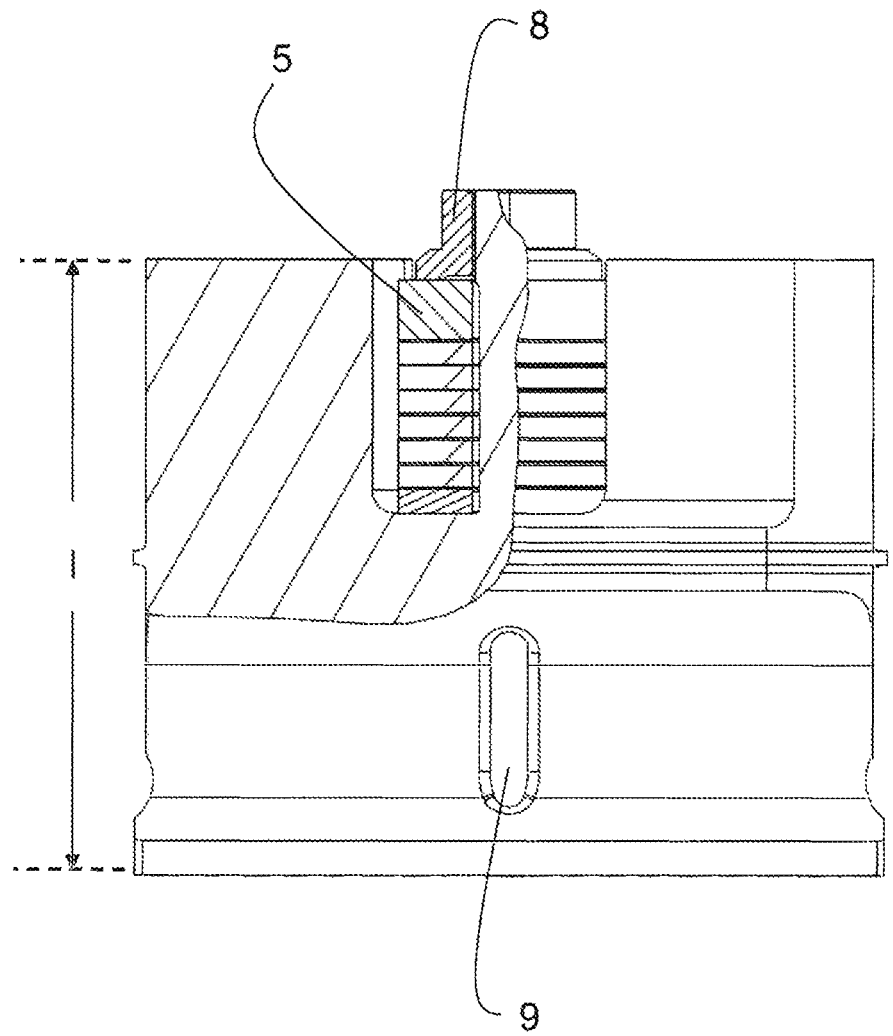
FIG. 3 a partially cut side view of the embodiment of FIG. 1.

FIG. 3 shows a partially cut side view of the converter 1.

The converter base part 3 has a length I which is composed of the length of the rear section 10 and the length of the front section 11 of the converter base part 3. The length I thus defines the distance between the welding surface 2 and the rear side of the converter base part. In use, a standing wave with a wavelength corresponding to twice the length I is formed in the converter.

In the front section 11 of the converter base part 3 there is also a slit 9 which does not extend to the welding surface 2. The slit 9 is arranged on the axis of the bolt 4 in order to improve the vibration behavior of the converter base part 3, which is designed as a sonotrode. A spacer disc 7 with a corresponding central opening is initially pushed over the bolt 4. The spacer disc 7, which like the converter base part 3 including the bolt 4 can be made of titanium, serves to absorb any unevenness on the surface of the converter base part in the immediate vicinity of the bolt 4. The spacer disc 7, which should rest as flat as possible on the surface of the converter base part 3, can however cope with minor deviations in surface quality without causing damage to the spacer disc 7. Likewise, the spacer disc distributes the force of the bolt evenly over the piezo elements. This prevents the risk of overstressing the piezo elements due to an uneven application of force.

The upper side of the spacer disc 7, i.e. the side facing away from the surface of the converter base part, is preferably provided with a high surface quality. This can be done, for example, by grinding or lapping.

Several, in the example shown six, piezo elements 6 are applied to the spacer disc 7, which are intended to transmit an electrical AC voltage signal into a mechanical vibration. On the side of the piezo elements 6 facing away from the converter base part 3, a pressure disc 5 is provided, which can be made of steel, for example. The bolt 4 has an external thread at its end section facing away from the converter base part 3, which in the example shown is designed as a saw thread in which a nut 8 engages. By tightening the nut 8, a force is exerted on the pressure disc 5 and via the pressure disc 5 on the piezo elements 6, which in turn transmit the vibration via the spacer element 7 to the converter base part 3, which is designed as a sonotrode.

It can be seen that the piezo elements 6, the spacer disc 7 as well as the pressure disc 5 have an inner diameter which is slightly larger than the outer diameter of the bolt 4, so that they can expand or contract in the axial direction, i.e. in the direction of the length I, without this having any effect on the bolt 4. The piezo elements can therefore perform an acoustic vibration without being affected by the bolt 4. Furthermore, care must be taken to ensure that the not inconsiderable electrical voltages applied to the piezo elements are not dissipated via the bolt. For this reason too, there must be a sufficiently large distance between the outer diameter of the bolt 4 and the inner diameter of the piezo elements 6.

Figure 4:
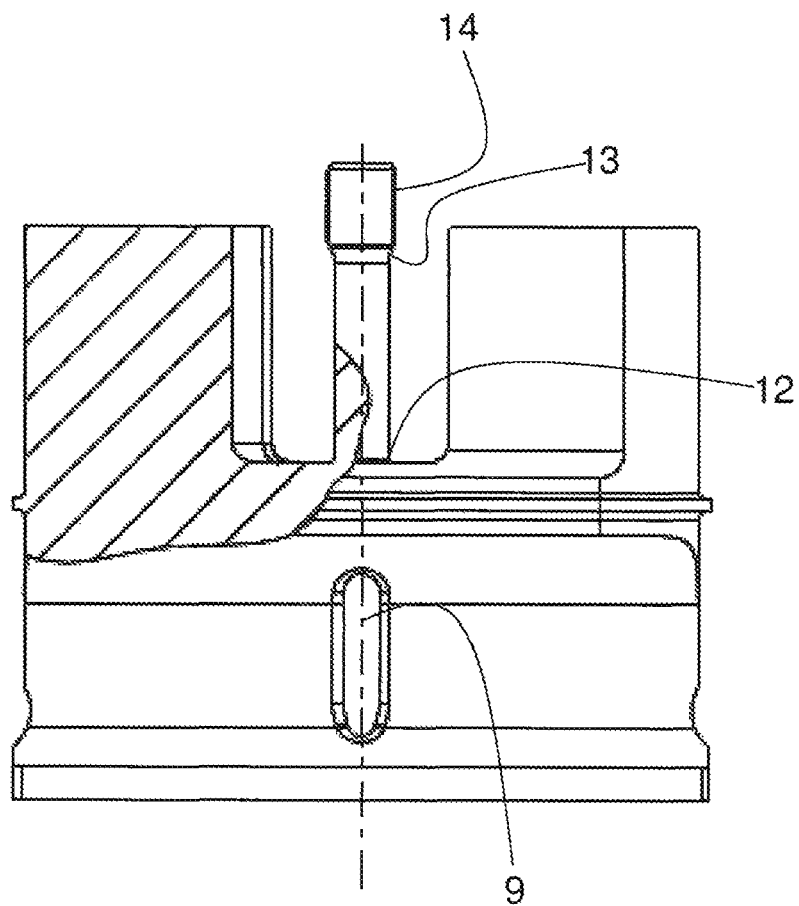
FIG. 4 a sectional view through the embodiment of FIG. 1 without piezo elements.

FIG. 4 shows a partially cut side view of the converter 1. Here, the piezo elements 6 shown in FIGS. 1-3 as well as the spacer disc 7, the pressure element 5 and the nut 8 have been removed.

It can be clearly seen in this figure that the bolt has a transition radius 12, which in the example shown, is 0.75 mm. At its end facing away from the converter base part, the bolt has a threaded section 14 onto which the nut 8 can be screwed in order to press the piezo elements 6 together with pressure element 5 and spacer element 7 against the converter base part 3. The described one-piece design of bolt 4 of the converter and converter base part 3 can significantly improve the operating time of the ultrasonic vibration unit.

The bolt is required to hold the nut 8, with which the necessary force is applied to the piezo elements in order to press them against the converter base part (or against the spacer disc).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Converter
2 Welding surface
3 Converter base part
4 Bolt
5 Pressure disc
6 Piezo element
7 Spacer disc
8 Nut
9 slit
10 rear section
11 front section
12 Transition radius
14 Threaded section
15 collar

The invention claimed is:

1. A converter comprising:
a converter base,
a bolt connected to the converter base,
a tensioning element, and
at least one piezo element with a through-opening,
wherein the bolt penetrates the through-opening and the tensioning element tensioning the at least one piezo element in a direction of the converter base in a material bond,
wherein the converter is designed as a sonotrode and the converter base has a welding surface which is configured to come into contact with a material to be processed, and
wherein the bolt is connected to the converter base in a material bond at a connection point with a transition radius R which is >0.5 mm.

2. The converter according to claim 1, where bolt and the converter base are manufactured from one piece of material.

3. The converter according to claim 1, wherein the transition radius>1 mm.

4. The converter according to claim 1, further comprising:
a spacer disc with a through-opening, the spacer disc and the at least one piezo element being arranged in such a way that the bolt first penetrates the through-opening of the spacer disc and then the through-opening of the at least one piezo element, so that the spacer disc abuts both the converter base and the at least one piezo element.

5. The converter according to claim 4, wherein the through-opening of the spacer disc widens on a side facing the converter base, and
   wherein the through-opening of the spacer disc has, in a sectional view parallel to a longitudinal direction along a length I, an entry radius E on a side facing the converter base which is >0.5 mm.

6. The converter according to claim 5, wherein $2R > E \geq R$ is true.

7. The converter according to claim 5, wherein $1.2R > E > R$ is true.

8. The converter according to claim 1, wherein the bolt has an end portion facing away from the converter base and having with an external thread.

9. The converter according to claim 8, wherein the external thread comprises a saw thread.

10. The converter according to claim 1, wherein the converter base has a rear side arranged opposite the welding surface and a recess formed in the rear side in which the bolt is arranged.

11. The converter according to claim 1, wherein the converter has a length I from the welding surface to the rear side, the bolt extending in a direction of the length I.

12. The converter according to claim 11, wherein the length I corresponds to half a wavelength of an ultrasonic oscillation with which the converter is brought into a resonant oscillation.

13. The converter according to claim 11, wherein the at least one piezo element is arranged in a longitudinal direction within the length I.

14. The converter according to claim 13, further comprising:
   at least four piezo elements each with a through-opening penetrated by the bolt and which are all arranged in the longitudinal direction within the length I.

15. The converter according to claim 1, wherein the transition radius>2 mm.

* * * * *